United States Patent [19]
Gruensfelder

[11] Patent Number: 6,076,766
[45] Date of Patent: Jun. 20, 2000

[54] FOLDING WING FOR AN AIRCRAFT

[75] Inventor: Cynthia Ann Gruensfelder, St. Louis, Mo.

[73] Assignee: McDonnell Douglas Corp., Huntington Beach, Calif.

[21] Appl. No.: 09/108,858

[22] Filed: Jul. 1, 1998

[51] Int. Cl.⁷ .................................................. B64C 3/56
[52] U.S. Cl. ........................................ 244/49; 244/130
[58] Field of Search ................................. 244/130, 131, 244/132, 49

[56] References Cited

U.S. PATENT DOCUMENTS

| | | | |
|---|---|---|---|
| 2,166,564 | 7/1939 | Atwood et al. | 244/49 |
| 2,368,702 | 2/1945 | Bourne | 244/130 |
| 2,670,910 | 3/1954 | Hill et al. | 244/49 |
| 2,731,221 | 1/1956 | Holton . | |
| 4,627,585 | 12/1986 | Einstein | 244/49 |
| 4,778,129 | 10/1988 | Byford . | |
| 4,892,626 | 1/1990 | Covey . | |
| 5,201,479 | 4/1993 | Renzelmann . | |
| 5,222,699 | 6/1993 | Albach et al. | 244/213 |
| 5,350,135 | 9/1994 | Renzelmann et al. . | |
| 5,356,094 | 10/1994 | Sylvain | 244/49 |
| 5,372,336 | 12/1994 | Paez | 244/49 |
| 5,381,986 | 1/1995 | Smith et al. . | |
| 5,662,294 | 9/1997 | Maclean et al. . | |
| 5,794,893 | 8/1998 | Diller et al. | 244/130 |
| 5,896,191 | 4/1999 | Beier et al. . | |
| 5,927,651 | 7/1999 | Geders et al. . | |
| 5,947,417 | 9/1999 | Cameron . | |
| 5,947,422 | 9/1999 | Wille . | |
| 5,975,466 | 11/1999 | Kahara et al. . | |
| 5,979,828 | 11/1999 | Gruensfelder et al. . | |

OTHER PUBLICATIONS

U.S. S/N 08/932,947; filed Sep. 17, 1997; (allowed).
U.S. S/N 09/082,817; filed May 21, 1998; (pending).
U.S. S/N 09/108,858; filed Jul. 1, 1998; (pending).
U.S. S/N 08/898,162; filed Jul. 22, 1997; (allowed).
U.S. S/N 08/897,341; filed Jul. 21, 1997; (pending).
U.S. S/N 08/576,298; filed Dec. 21, 1995; (allowed).
U.S. S/N 08/718,771; filed Sep. 24, 1996; (abandoned).
U.S. S/N 08/718,771; filed Aug. 20, 1998; (pending).
U.S. S/N 08/814,497; filed Mar. 10, 1997; (pending).
U.S. S/N 09/094,299; filed Jun. 9, 1998; (pending).
U.S. S/N 08/576,466; filed Dec. 21, 1995; (allowed).
U.S. S/N 08/807,295; filed Feb. 27, 1997; (allowed).
U.S. S/N 09/294,443; filed Aug. 17, 1998; (pending).
U.S. S/N 09/294,444; filed Aug. 17, 1998 (pending).
U.S. S/N 08/818,108; filed Mar. 13, 1997; issued as U.S. Patent No. 5,958,803.
U.S. S/N 08/848,228; filed Apr. 30, 1997; (pending).
U.S. S/N 08/885,225; filed Jun. 30, 1997; (pending).

*Primary Examiner*—Galen L. Barefoot
*Attorney, Agent, or Firm*—Harness Dickey & Pierce P.L.C.

[57] ABSTRACT

A wing fold (50) for an aircraft has inner wing (74) connected to the aircraft and an outer wing (76) connected to the inner wing (74) by a hinge (72). An actuator (72) is capable of rotating the outer wing (76) over ninety degrees with respect to the inner wing (74). A first reinforced elastomer panel (54) is connected between a lower surface (52) of the inner wing (74) and a lower surface (58) of the outer wing (76).

36 Claims, 10 Drawing Sheets

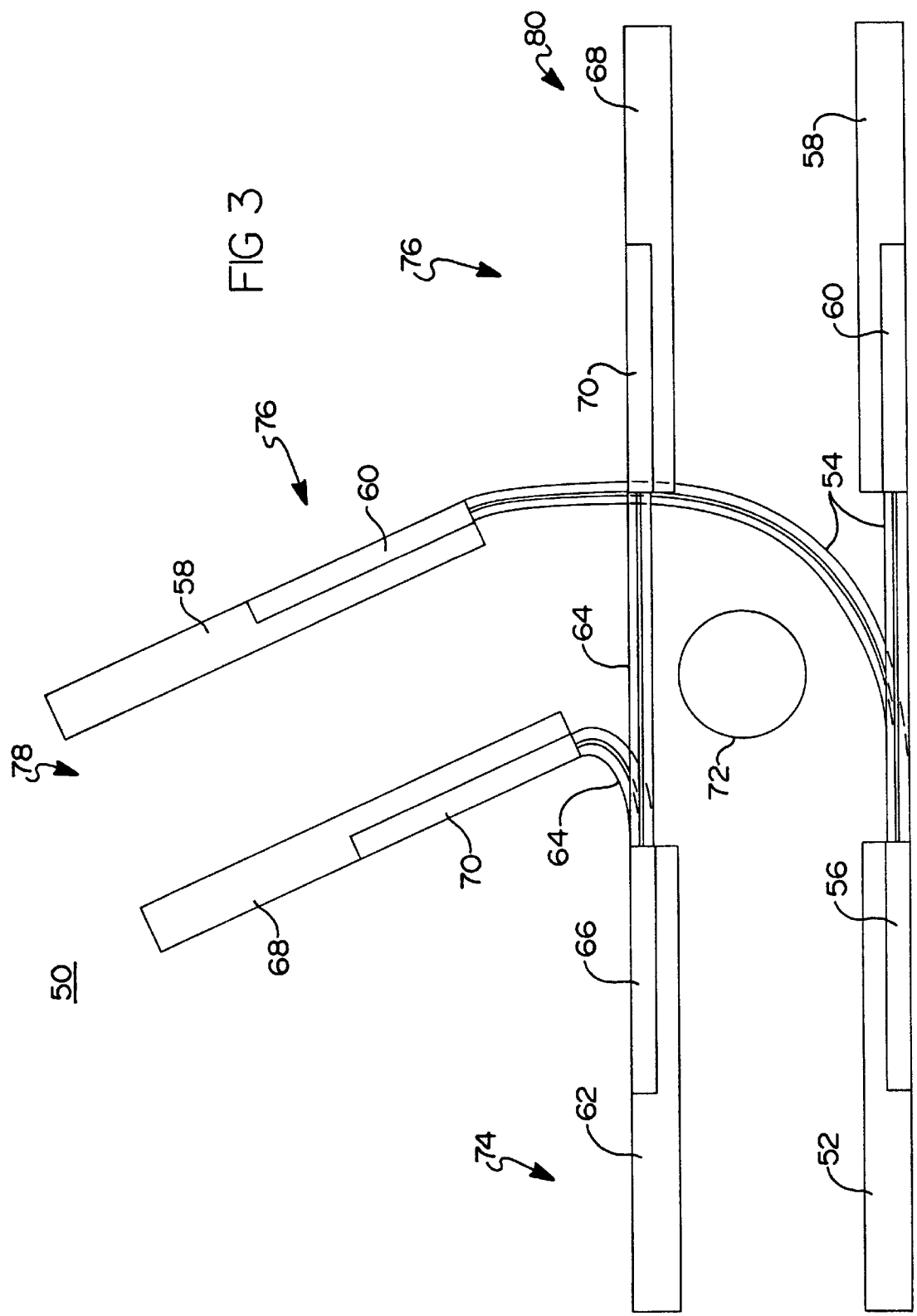

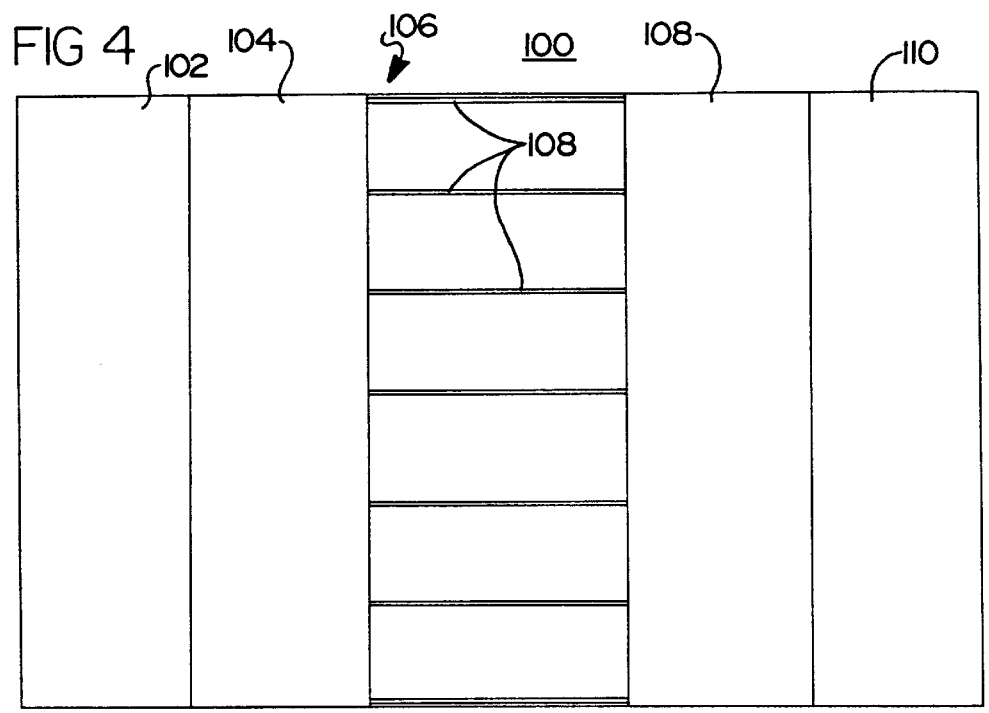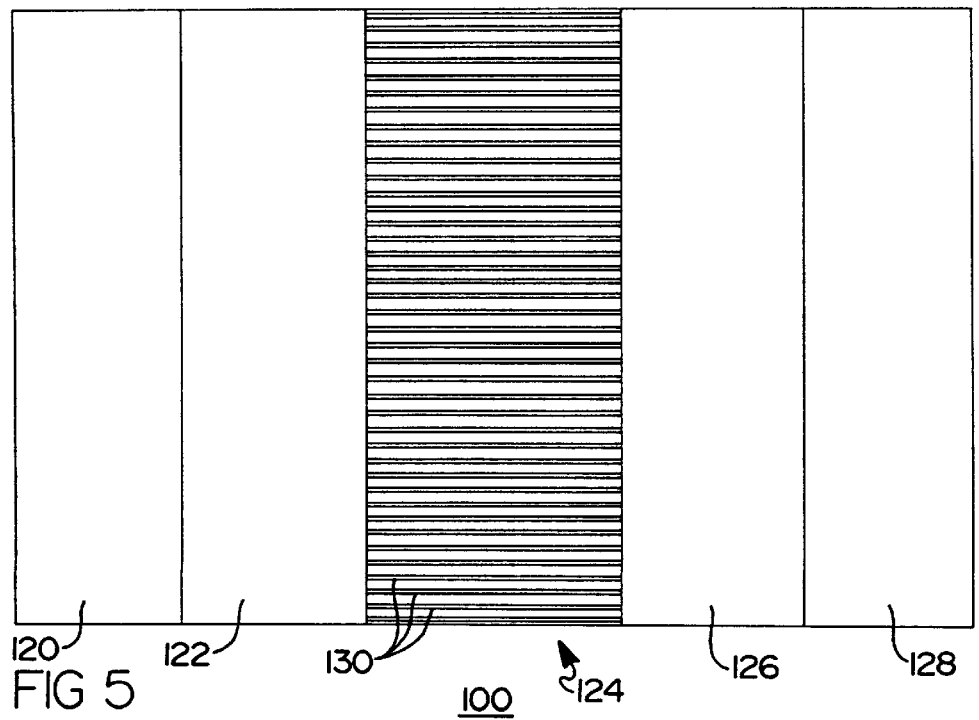

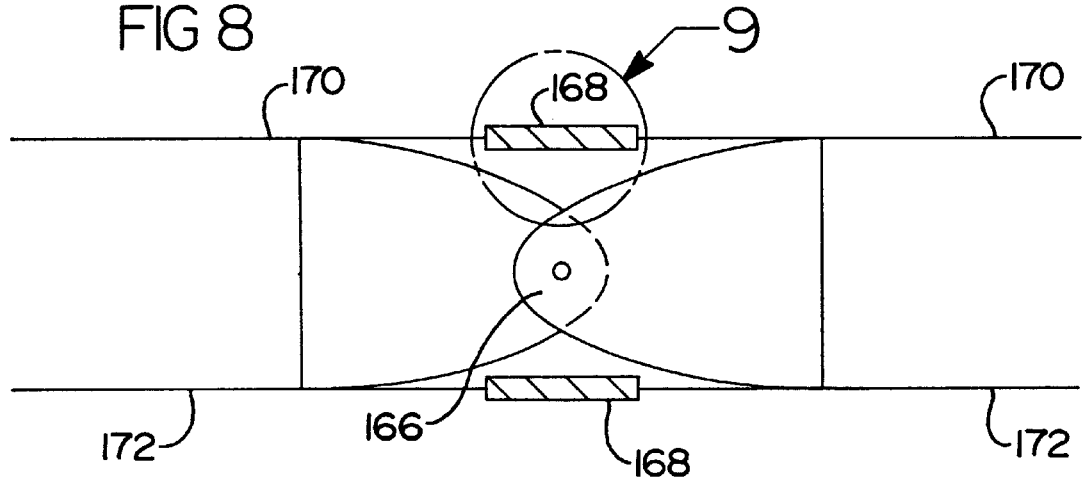
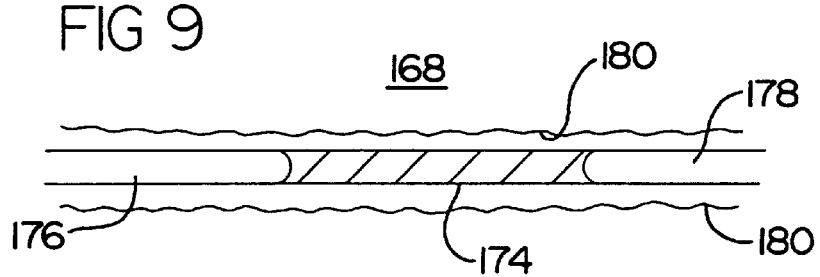
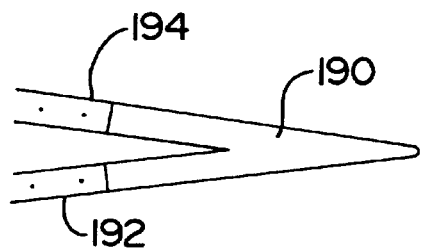

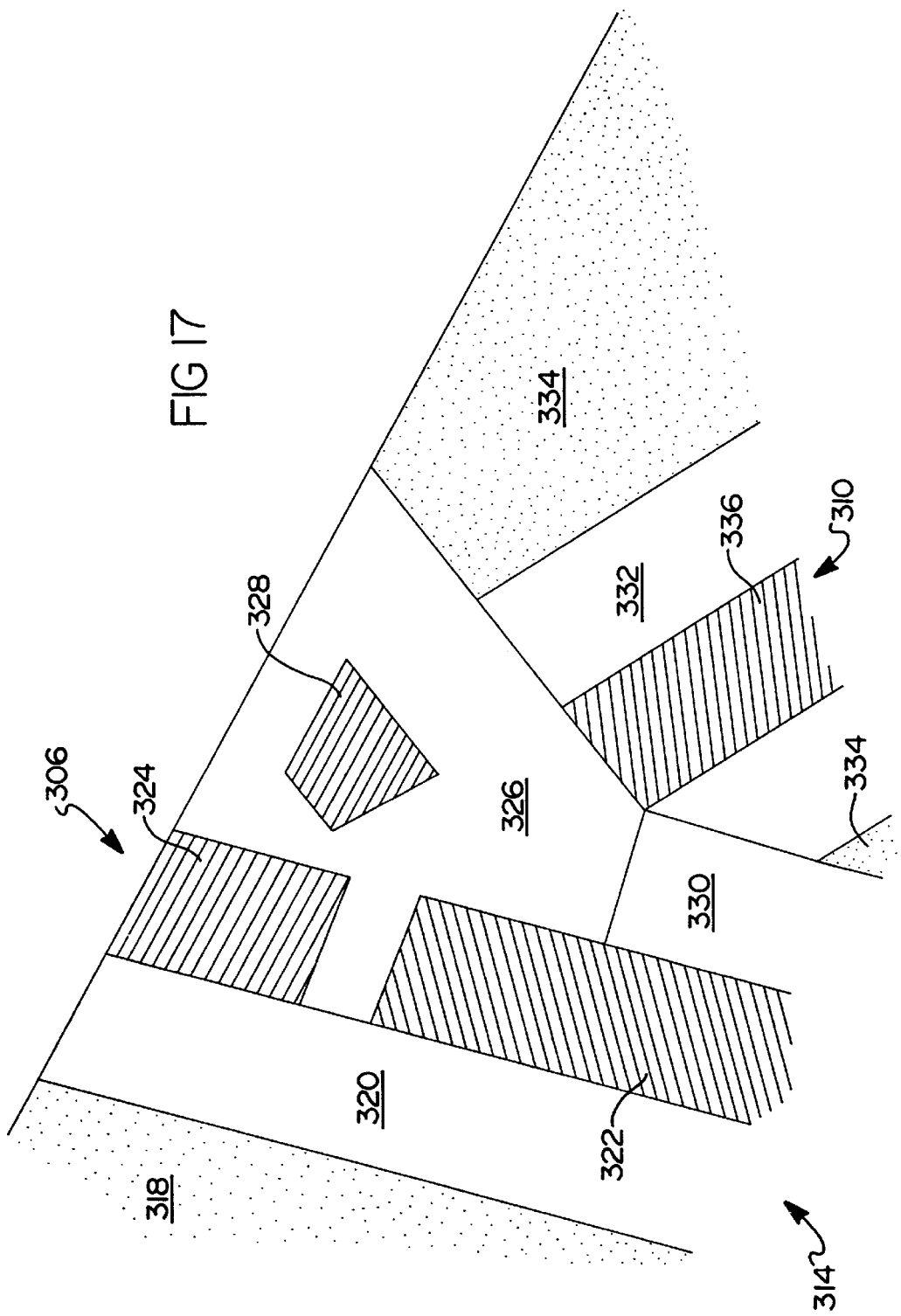

FOLDING WING FOR AN AIRCRAFT

FIELD OF THE INVENTION

The present invention relates generally to the field of aircraft and more particularly to a wing fold for an aircraft.

BACKGROUND OF THE INVENTION

Aircraft designed to fly off aircraft carriers have wings that are designed to fold up when the aircraft is not in use on the carrier. The folding wings significantly decrease the space required to store the aircraft. This allows the aircraft carrier to support more aircraft. Unfortunately, the hinges where the wings fold have gaps that reduce the performance of these aircraft. The gaps in the wings allow air slippage from the high pressure side of the wing to the low pressure side of the wing. One solution has been to add blade seals. A blade seal is a metal plate that overlaps the gap. The blade seal cannot be fixed to both sides of the gap or the wing will no longer fold. As are result, blade seals still allow air slippage.

Another problem faced by aircraft designers is the need to eliminate the gap that is created by a movable wing tip.

Thus there exists a need for a folding wing for an aircraft that reduces the air slippage and a movable wing tip that does not have a gap.

SUMMARY OF THE INVENTION

A wing fold for an aircraft that overcomes these and other problems has an inner wing connected to the aircraft and an outer wing connected to the inner wing by a hinge. An actuator is capable of rotating the outer wing over ninety degrees with respect to the inner wing. A first reinforced elastomer panel is connected between a lower surface of the inner wing and a lower surface of the outer wing.

BRIEF DESCRIPTION OF THE DRAWINGS

FIG. 3 is a partial schematic view of a folding wing in a folded position and an extended position in accordance with one embodiment of the invention;

FIG. 4 is a partial top schematic view of a folding wing in accordance with one embodiment of the invention;

FIG. 5 is a partial bottom schematic view of a folding wing in accordance with one embodiment of the invention;

FIG. 8 is a cross sectional view of the folding wing of FIG. 7 taken along the A—A line;

FIG. 9 is a expanded view of the area B of FIG. 8;

FIG. 10 is a partial cross sectional view of a tail section of a folding wing in accordance to one embodiment of the invention;

FIG. 17 is an expanded view of the section C of FIG. 16.

DETAILED DESCRIPTION OF THE DRAWINGS

Figure 1:
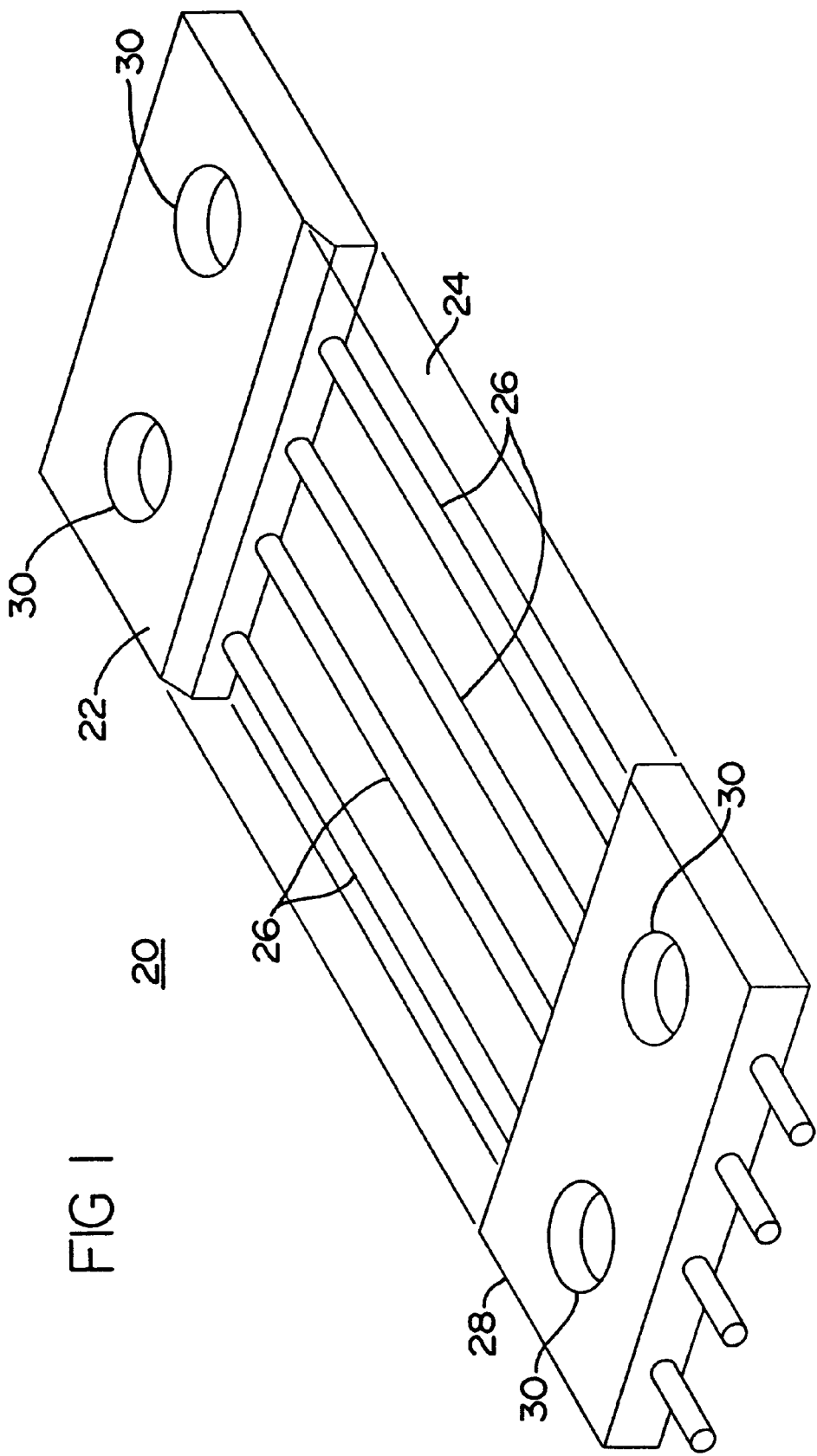
FIG. 1 is a perspective view of a reinforced elastomer panel.

FIG. 1 is a perspective view of a reinforced elastomer panel 20. The reinforced elastomer panel 20 or a variation thereon is used to eliminate the gaps in a folding wing. As a result, it is important to understand how the reinforced elastomer panel 20 works, before explaining the invention generally. The reinforced elastomer panel 20 has a rod block 22 attached along one edge to an elastomer skin 24. The elastomer skin 24 is capable of stretching to 100% of its unstressed length. In addition, the elastomer skin 24 is capable of twisting. A plurality of rods (reinforcing members) 26 are attached to the rod block 22 and are allowed to slide freely inside the elastomer skin 24. Other reinforcing member shapes can be used. For example the rods 26 can be replaced with slats or other shapes and designs depending on the requirements, such as stiffness, of the application. The rods 26, in one embodiment, are made from quartz, epoxy or composites and flex without breaking. The stiffness of these reinforcements is designed to yield a specific shape when stressed. The rods 26 slide freely inside a second rod block 28. The rods 26 provide the elastomer skin (elastomer sheet) 24 with a smooth curvilinear shape when the elastomer panel 20 is elongated, deflected or twisted. This curvilinear shape provides a good aerodynamic shape without any discontinuities that cause turbulence and drag. A plurality of attachment provisions 30 are used to attach the elastomer panel 20 to the aircraft.

Figure 2:
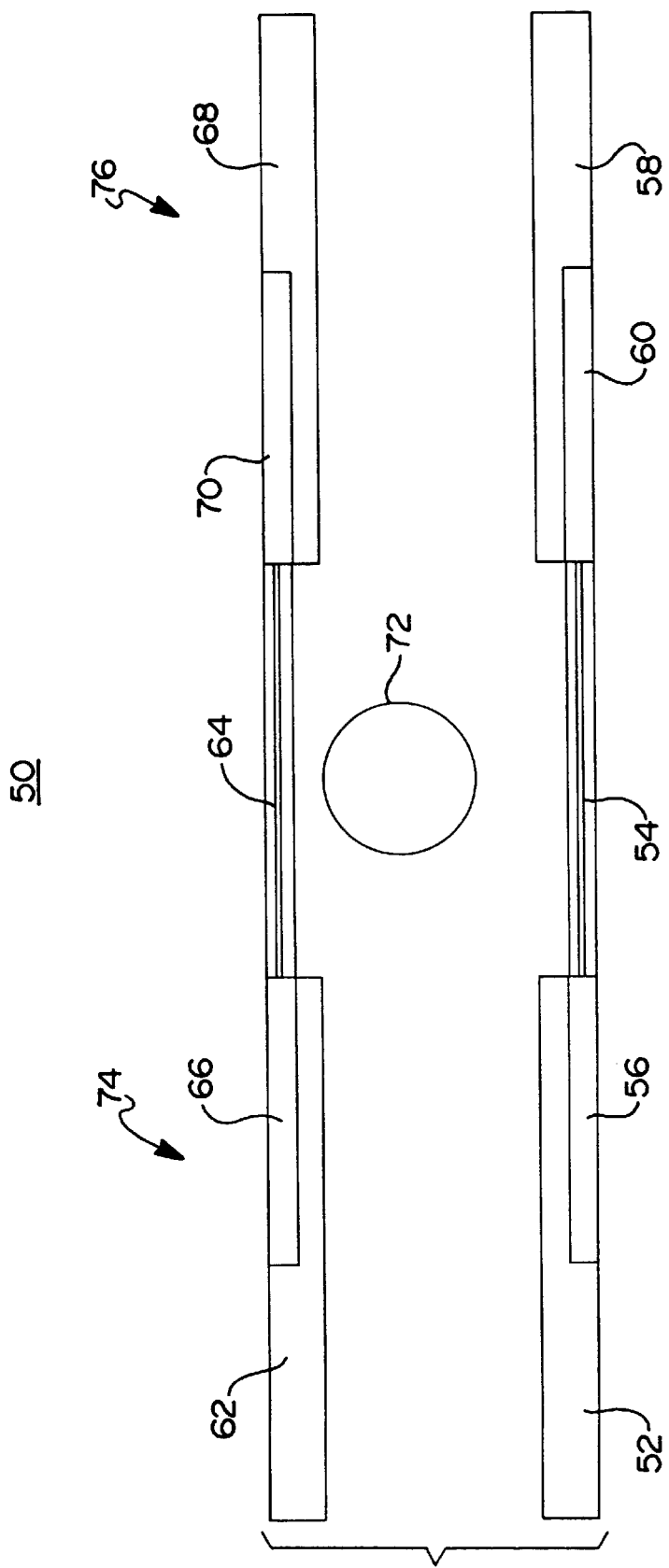
FIG. 2 is a partial schematic view of a folding wing in accordance with one embodiment of the invention.

FIG. 2 is a partial schematic view of a folding wing 50 in accordance with one embodiment of the invention. An inner wing lower surface (skin) 52 is connected to a first reinforced elastomer panel 54 by a block 56. An outer wing lower surface (skin) 58 is connected to the first reinforced elastomer panel 54 by a block 60. An inner wing top surface (skin) 62 is connected to a second reinforced elastomer panel 64 by a block 66. An outer wing top surface (skin) 68 is connected to the second reinforced elastomer panel 64 by a block 70. A schematic representation of a hinge and actuator 72 is shown between the inner wing 74 and outer wing 86. The hinge (pivotal connector) 72 connects the inner wing 74 to the outer wing 76. The actuator 72 is capable of rotating the outer wing over ninety degrees with respect to the inner wing 74.

FIG. 3 is a partial schematic view of a folding wing 50 in a folded position (raised position) 78 and an extended position (horizontal position) 80 in accordance with one embodiment of the invention. This figure illustrates the bending that the reinforced elastomer panels 54, 64 undergo. The reinforced elastomer panels 54, 64 are designed to provide the required stiffness for the aircraft in operation or the extended position 80. This requirement is balanced with the need to fold the wing 50 using standard actuator designs and motors. As a result, the first reinforced elastomer panel 54 is stiffer than the second reinforced elastomer panel 64. This is because of the tight radius that the second reinforced elastomer panel 64 has to make in the folded position 78.

FIG. 4 is a partial top schematic view of a folding wing (wing fold) 100 in accordance with one embodiment of the invention. An inner wing top skin 102 is connected to a first rod block 104 of the second reinforced elastomer panel 106. The second rod block 108 is connected to an outer wing top skin 110. As explained above, the second reinforced elastomer panel (upper reinforced elastomer panel) 106 is less stiff than the first (lower) reinforced elastomer panel. The stiffness of the second reinforced elastomer panel 106 is decreased in this embodiment by reducing the number of reinforcing rods 108. In another embodiment, the stiffness of the upper panel 106 is reduced by using a more flexible material for the elastomer skin 24 (see FIG. 1). In another embodiment, the stiffness of the upper panel 106 is reduced by using a more flexible material for the rods 108. In yet another embodiment, the stiffness of the upper panel 106 is reduced by using a more flexible shape for the reinforcing member 106. For instance, the reinforcing member can be made into thin slats. These thin slats are very flexible when bent perpendicular to their long edge.

FIG. 5 is a partial bottom schematic view of a folding wing 100 in accordance with one embodiment of the invention. An inner wing lower skin 120 is connected to a first rod block 122 of the first reinforced elastomer panel 124. The second rod block 126 is connected to an outer wing lower skin 128. As explained above, the first reinforced elastomer panel (lower reinforced elastomer panel) 124 is stiffer than the second (upper) reinforced elastomer panel. The stiffness of the first reinforced elastomer panel 124 is increased in this embodiment by increasing the number of reinforcing rods 130. In another embodiment, the stiffness of the lower panel 124 is increased by using a less flexible material for the elastomer skin (stiffer elastomer skin material) 24 (see FIG. 1). In another embodiment, the stiffness of the lower panel 124 is increased by using a less flexible material for the rods (stiffer reinforcing member material) 130. In yet another embodiment, the stiffness of the lower panel 124 is increased by using a less flexible shape (stiffer reinforcing member shape) for the reinforcing member 130. For instance, the reinforcing member can be made into thicker rods or bars.

Figure 6:
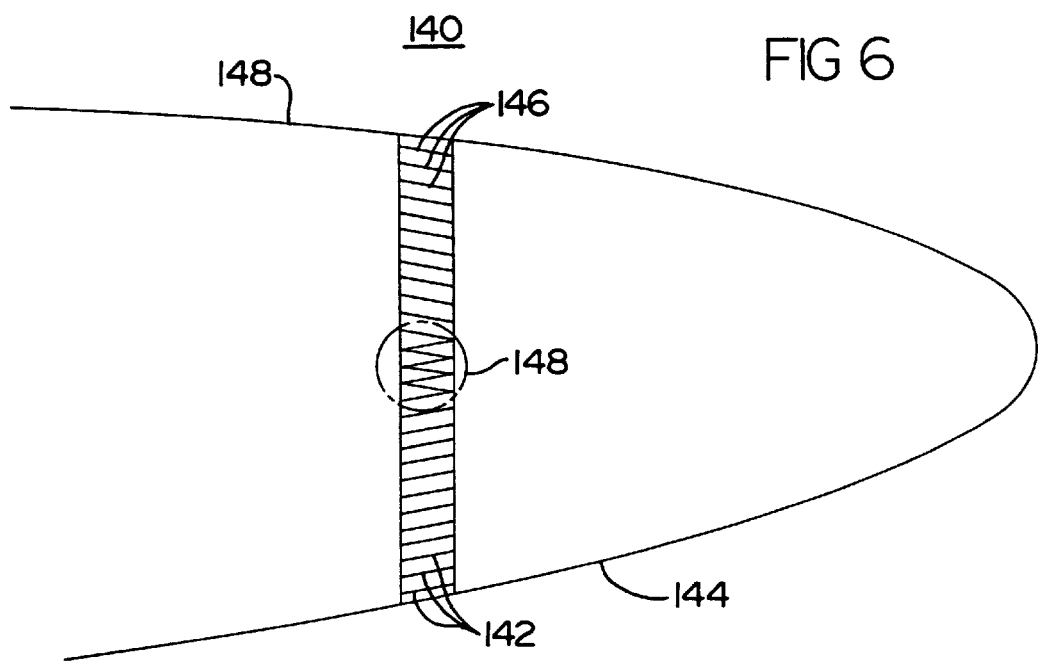
FIG. 6 is a partial top view of a folding wing in accordance with one embodiment of the invention.

FIG. 6 is a partial top view of a folding wing 140 in accordance with one embodiment of the invention. This figure schematically illustrates that a first plurality of reinforcing members 142 are parallel to a leading edge 144 near the leading edge. A second plurality of reinforcing members 146 are parallel to a trailing edge 148. In one embodiment the first plurality of reinforcing rods 142 overlap the second plurality of reinforcing rods 146 only in a transition section 148.

Figure 7:
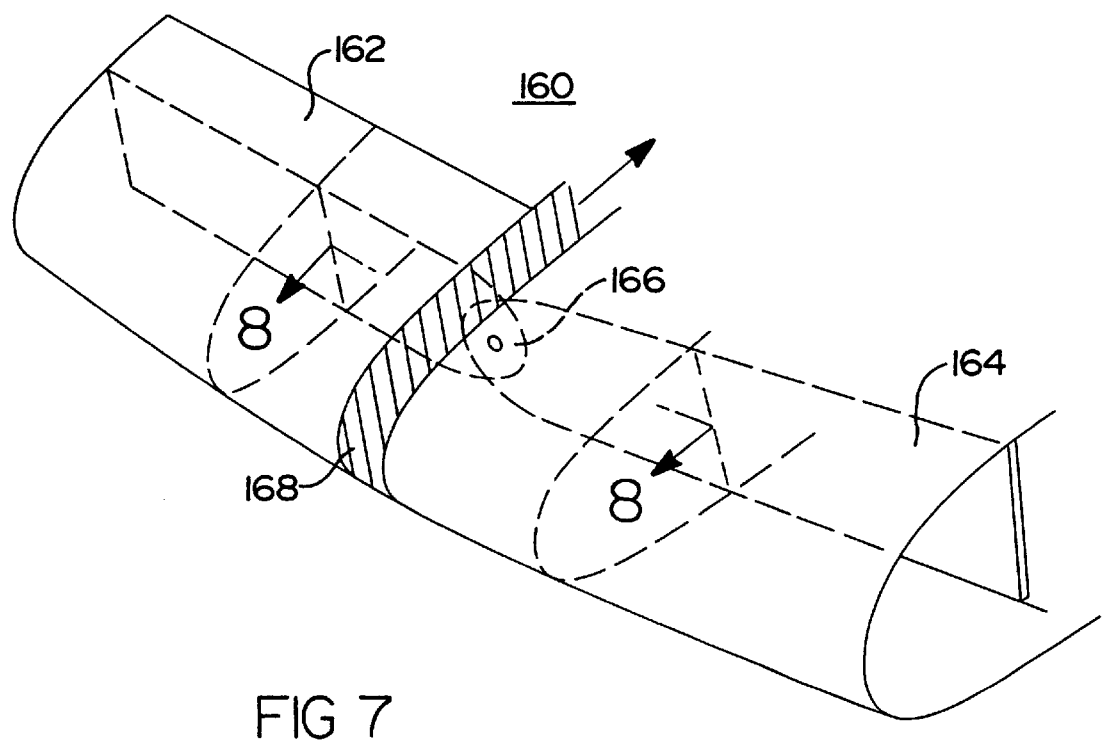
FIG. 7 is a partial perspective view of a folding wing in accordance with one embodiment of the invention.

FIG. 7 is a partial perspective view of a folding wing 160 in accordance with one embodiment of the invention. The inner wing (inner wing portion) 162 is connected to the outer wing (outer wing portion) 164 by a hinge 166. The view shown in this figure is the leading edge of the wing 160. Along the leading edge, the reinforced elastomer panels merge into an elastomer skin 168 shown as a hatched area. FIG. 8 is a cross sectional view of the folding wing of FIG. 7 taken along the A—A line. FIG. 9 is an expanded view of the area B of FIG. 8. This figures shows the elastomer skin (leading edge seal) 168 includes an elastomer panel 174 connected between a metal skin 176 and a metal skin 178. An environmental skin 180 covers both a top surface and a lower surface. The environmental skin 180 is made of a knit material that is capable of elastically stretching 100% of its original length. The environmental skin 180 will be explained in more detail with respect to FIGS. 11 & 12.

FIG. 10 is a partial cross sectional view of a tail section of a folding wing in accordance to one embodiment of the invention. A trailing edge flexible strut (flexible trailing edge strut) 190 connects to the first reinforced elastomer panel 192 and the second reinforced elastomer panel 194. The flexible strut is made of a rubber and is capable of being bent into the folded position.

Using the folding wing described herein eliminates the air slippage between a high pressure side of the wing and a low pressure side of the wing. This increases the performance of the aircraft.

Figure 11:
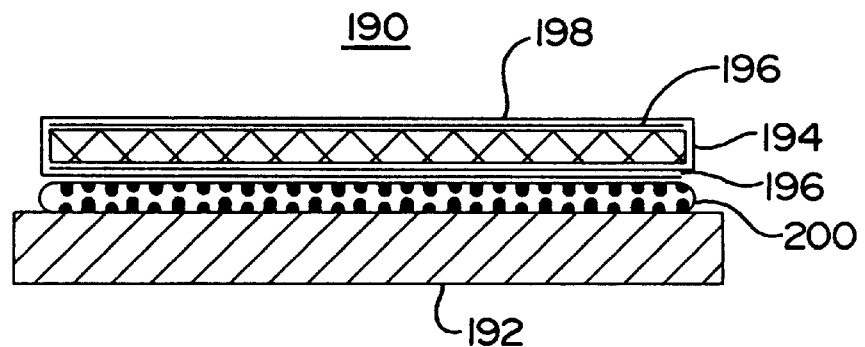
FIG. 11 is a schematic view of an environmental skin.

FIG. 11 is a schematic view of an environmental skin 190. The surface 192 can be the rod reinforced elastomer discussed above or the skin of the aircraft. The environmental skin 190 has a fabric 194 containing a plurality of fibers. In one embodiment the fabric is a warp knit fabric (warp knit style weave) made from polyamide fibers. In addition the fabric may contain a small amount of elastic polyurethane fiber (e.g., approximately 10%). The polyurethane or other elastic fiber assists in the recovery of the material after stretching. Note that other materials and weaves are available. For instance, tubular knit weaves or other weaves that permit reversible elongation without permanent deformation or fabric damaged can be used and higher temperature resistant materials such as super polyamide, glass, and quartz fibers can be knit when necessary for increased thermal performance. The fabric 194 is coated with a conductive substance by electrolessly plating the fabric 194 in one embodiment. The electroless plating deposits from five to forty percent (by weight) silver, nickel, copper, tin or other metal or combination of metals 196 on the fabric 194. In another embodiment each of the plurality of fibers forming the fabric (plane) 194 are electrolessly plated and then woven. An environmental coating 198 is then applied over the fabric 194. The environmental coating 198 is an elastomeric coating (elastomer) which can be in the form of flourosilicones, flouroelastomers, silicones, thermoplastic elastomers, urethanes or other viable elastic materials. An elastomeric adhesive (adhesive) 200 is applied to a side of the environmental coating 198 to attach the environmental skin 190 to the surface 192.

Tests have shown that the environmental skin is capable of a minimum of 100% elongation in all directions at the required operating temperature (operating range) (e.g., −65° to 250° Fahrenheit). The tensile moduli for the material is less than 1,000 pounds per square inch (PSI) over the operating conditions.

Figure 12:
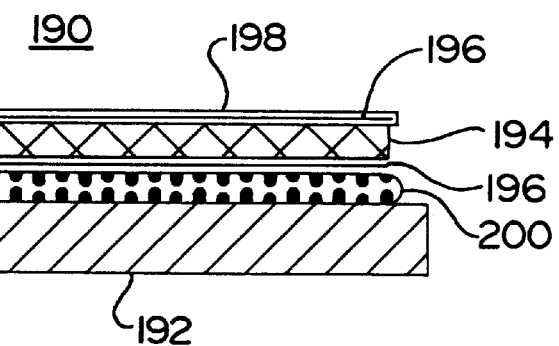
FIG. 12 is a schematic view of an environmental skin.

FIG. 12 is a schematic view of an environmental skin 190. In this embodiment the fabric (plurality of fibers) 194 only has the environmental coating 198 on the top surface of the fabric 194. The elastomeric adhesive 200 is applied to a second surface of the fabric 194 or to the surface 192, to attach the environmental skin 192 to the surface 192.

Figure 13:
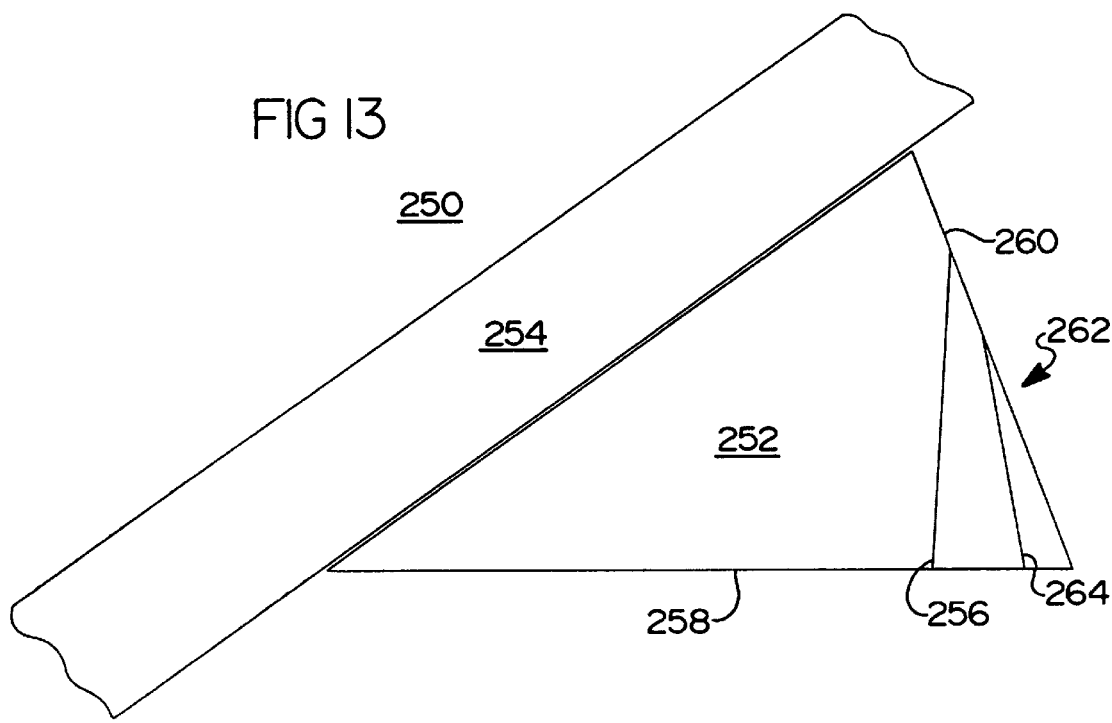
FIG. 13 is a schematic view of a wing tip in accordance with one embodiment of the invention.

FIG. 13 is a schematic view of a wing tip 250 in accordance with one embodiment of the invention. A wing 252 of an aircraft is connected to a fuselage 254. A hinge 256 runs from a leading edge 258 of the wing 252 to a trailing edge 260 of the wing 252. A standard actuator is capable of rotating the wing tip 262 about the wing 252. The hinge 256 connects the wing 252 to the wing tip 262. In this embodiment, a second hinge 264 extends through the wing tip 262.

Figure 14:
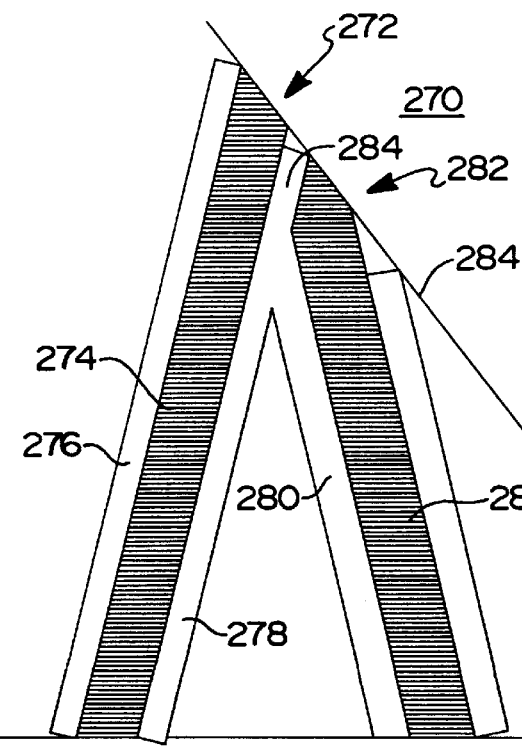
FIG. 14 is a schematic top view of a portion of a wing tip in accordance with one embodiment of the invention.

FIG. 14 is a schematic top view of a portion of a wing tip 270 in accordance with one embodiment of the invention. Note that the upper and lower views are essentially the same. As a result only the top surface will be explained. The first hinge 272 has a first (second) reinforced elastomer panel connecting a bottom (top) surface of the wing 252 to a bottom (top) surface of the wing tip 262. The first rod block 276 of the first (second) reinforced elastomer panel 274 is connected to the wing 252. The second rod block 278 merges with a first rod block 280 of a second hinge 282. At an overlap section 284 reinforcing member from the first (second) reinforced elastomer panel and from the third (fourth) reinforced elastomer panel 286 use the same rod block. In one embodiment, the reinforcing members are positioned in an alternating pattern in the overlap section 284. In another embodiment, the reinforced elastomer panels 274, 286 terminate at a trailing edge 284 in a flexible strut similar to the strut of FIG. 10. The reinforcing members wrap around the leading edge of the wing. This is possible because the deflections are significantly less than in the folding wing case. Note that in one embodiment the reinforcing members are parallel to the leading edge near the leading edge and parallel to the trailing edge near the trailing edge. In one embodiment, these two sets of reinforcing member overlap for a small section.

Figure 15:
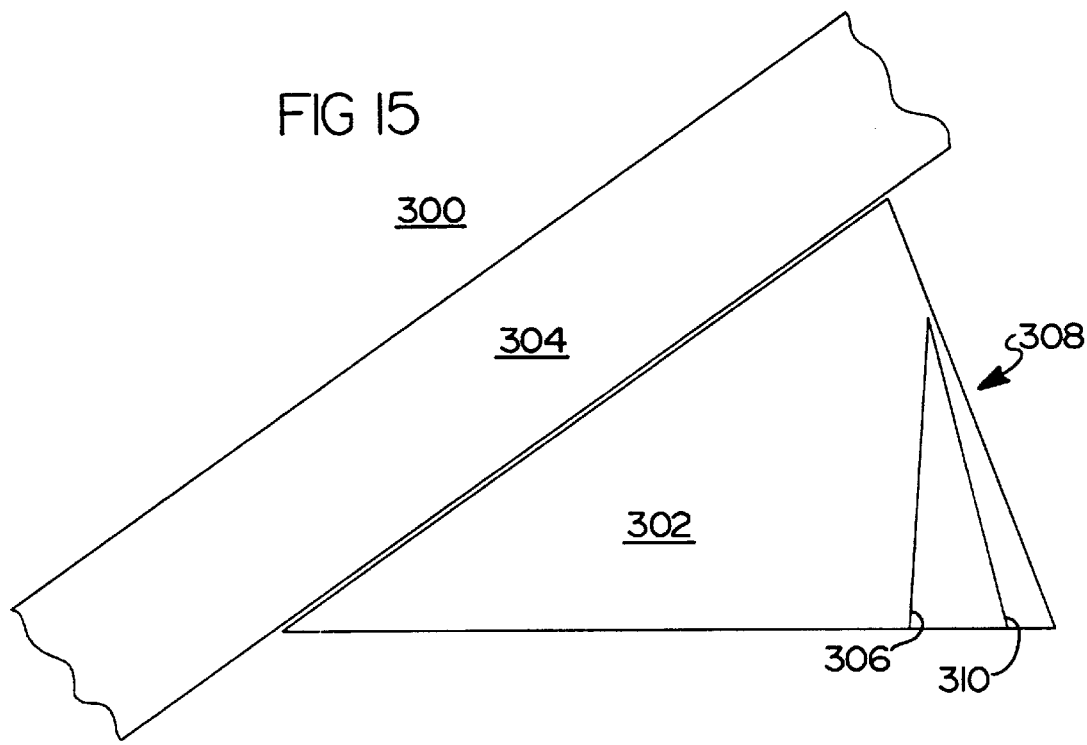
FIG. 15 is a schematic view of a wing tip in accordance with one embodiment of the invention.

FIG. 15 is a schematic view of a wing tip 300 in accordance with one embodiment of the invention. A wing 302 of an aircraft is connected to a fuselage 304. A first hinge 306 connects the wing 304 to a wing tip 308. A second hinge 310 cuts through the wing tip 308 and makes a V with the first hinge 306. The point of the V is at a trailing edge of the wing 302.

Figure 16:
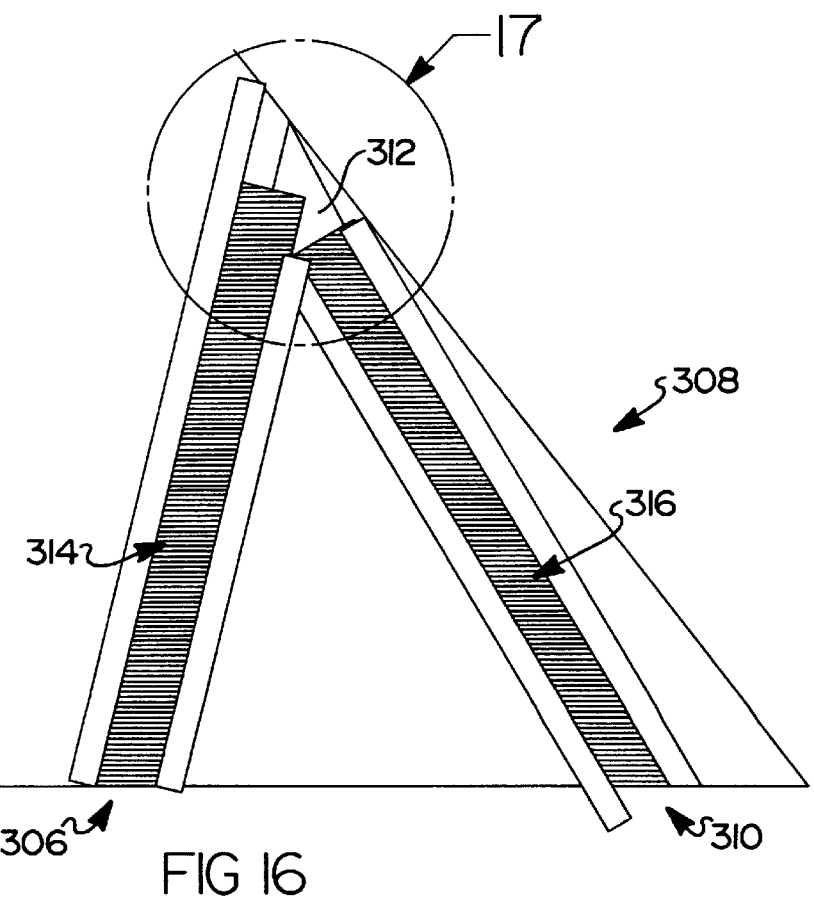
FIG. 16 is a schematic top view of a portion of a wing tip in accordance with one embodiment of the invention.

FIG. 16 is a schematic top view of a portion of a wing tip 308 in accordance with one embodiment of the invention. This drawing shows an intersection area 312 of the two hinges 306, 310 covered by reinforced elastomer panels 314, 316. FIG. 17 is an expanded view of the section C of FIG. 16. This view shows the wing surface 318 attached to a first rod block 320 of the reinforced elastomer panel 314. The rod block 320 is connected to an elastomer skin having reinforcing members. One section 322 of reinforcing members are parallel to a leading edge, while a second section of reinforcing members 324 run parallel to a trailing edge. A hard durometer elastomer section 326 mates with the first hinge 306 and the second hinge 310. A floating section 328 in the hard durometer elastomer section 326 is used to stiffen this intersection area. The floating section 328 has a plurality of reinforcing members. As a result, when an application requires a stiffer design this floating section area is expanded. The hard durometer elastomer section 326 is bounded by the rod blocks 330, 332 and the wing tip surface 334. Note that the reinforcing members 336 of the reinforced elastomer section covering the second hinge 310 run parallel to the leading edge.

Using the wing tip described herein air slippage between a high pressure side and a low pressure side is eliminated.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A wing for an aircraft which can be folded without forming gaps or surface discontinuities at a fold area of the wing, the wing comprising:
    an inner wing connected to the aircraft;
    an outer wing;
    a hinge connecting the inner wing to the outer wing;
    an actuator capable of rotating the outer wing over ninety degrees with respect to the inner wing; and
    a first reinforced elastomer panel connected between a lower surface of the inner wing and a lower surface of the outer wing, the elastomer panel being able to stretch to allow the outer wing to be pivoted relative to the inner wing without forming gaps or surface discontinuities in the wing.

2. The wing fold of claim 1, further including a second reinforced elastomer panel connected between a top surface of the inner wing and a top surface of the outer wing.

3. The wing fold of claim 2, wherein the first reinforced elastomer panel is stiffer than the second reinforced elastomer panel.

4. The wing fold of claim 3, wherein the stiffness of the first reinforced elastomer panel is increased over the second reinforced elastomer panel by a greater number of reinforcing members in the first reinforced elastomer panel than in the second reinforced elastomer panel.

5. The wing fold of claim 3, wherein the stiffness of the first reinforced elastomer panel is increased over the second reinforced elastomer panel by a stiffer elastomer skin material in the first reinforced elastomer panel compared to the second reinforced elastomer panel.

6. The wing fold of claim 3, wherein the stiffness of the first reinforced elastomer panel is increased over the second reinforced elastomer panel by a stiffer reinforcing member material in the first reinforced elastomer panel compared to the second reinforced elastomer panel.

7. The wing fold of claim 3, wherein the stiffness of the first reinforced elastomer panel is increased over the second reinforced elastomer panel by a stiffer reinforcing member shape in the first reinforced elastomer panel compared to the second reinforced elastomer panel.

8. The wing fold of claim 1, wherein the first reinforced elastomer panel has a first plurality of reinforcing rods running parallel to a leading edge of the inner wing and a second plurality of reinforcing rods running parallel to a trailing edge of the inner wing.

9. The wing fold of claim 8, wherein the first plurality of reinforcing rods overlap the second plurality of reinforcing rods only in a transition section.

10. The wing fold of claim 2, further including a trailing edge flexible strut connected to the first reinforced elastomer panel and the second reinforced elastomer panel.

11. The wing fold of claim 2, further including a leading edge seal comprising an elastomer skin having a first end connected to an end of the first reinforced elastomer panel and a second end connected to an end of the second reinforced elastomer panel.

12. The wing fold of claim 11, wherein the leading edge seal further includes an environmental skin covering the elastomer skin and adhering to a metal skin of the inner wing and a metal skin of the outer wing.

13. The wing fold of claim 12, wherein the elastomer skin has a first edge that adheres to the metal skin of the inner wing and a second edge that adheres to the metal skin of the outer wing.

14. A wing for an aircraft which can be folded without forming gaps or surface discontinuities in a surface of the wing, the wing comprising:
    an inner wing portion attached to the aircraft;
    an outer wing portion;
    a pivotal connector connecting the inner wing portion to the outer wing portion, the pivotal connector enabling the outer wing portion to pivot from a horizontal position to a raised position;
    an upper reinforced elastomer panel connecting an upper surface of the inner wing portion to an upper surface of the outer wing portion;
    a lower reinforced elastomer panel connecting a lower surface of the inner wing portion to a lower surface of the outer wing portion, and
    the upper and lower reinforced elastomer panels further operating to facilitate pivoting of the outer wing portion relative to the inner wing portion without forming gaps or surface discontinuities in the upper and lower surfaces of the inner and outer wing portions.

15. The folding wing of claim 14, wherein the lower reinforced elastomer panel is stiffer than the upper reinforced elastomer panel.

16. The folding wing of claim 14, further including a flexible trailing edge strut connected to the upper reinforced elastomer panel and the lower reinforced elastomer panel.

17. The folding wing of claim 16, wherein the flexible trailing edge strut is made of a rubber.

18. The folding wing of claim 14, wherein the upper reinforced elastomer panel includes a first plurality of reinforcing members that are parallel to a leading edge of the outer wing and a second plurality of reinforcing members that are parallel to a trailing edge of the outer wing.

19. The folding wing of claim 18, wherein the first plurality of reinforcing members overlap the second plurality of reinforcing members in a transition section.

20. A wing tip for an aircraft comprising:
a hinge running from a leading edge of a wing to a trailing edge of the wing, the hinge connecting the wing to the wing tip;
an actuator capable of rotating the wing tip about the hinge; and
a first reinforced elastomer panel connected between a bottom surface of the wing and a bottom surface of the wing tip for facilitating folding of the wing tip relative to the wing without forming gaps or surface discontinuities therebetween.

21. The wing tip of claim 20, further including a second reinforced elastomer panel connected between a top surface of the wing and a top surface of the wing tip.

22. The wing tip of claim 21, further including a second hinge extending through the wing tip.

23. The wing tip of claim 22, further including a third reinforced elastomer panel connected between a bottom surface of an inner wing tip and a bottom surface of an outer wing tip.

24. The wing tip of claim 23, further including a fourth reinforced elastomer panel connected between an upper surface of the inner wing tip and an upper surface of the outer wing tip.

25. The wing tip of claim 24, wherein the third reinforced elastomer panel and a fourth reinforced elastomer panel are joined along the leading edge.

26. The wing tip of claim 24, wherein the first hinge and the second hinge form a V shape.

27. The wing tip of claim 26, further including an intersection area comprising a hard durometer elastomer section mating with the first hinge and the second hinge.

28. The wing tip of claim 27, wherein the intersection area including a floating section inside the hard durometer elastomer section.

29. The wing tip of claim 28, wherein the floating section is a reinforced elastomer panel.

30. The wing tip of claim 22, wherein the first hinge and the second hinge do not intersect.

31. A wing tip for an aircraft comprising:
a first hinge running from a leading edge of a wing to a trailing edge of the wing, the hinge connecting the wing to the wing tip;
an actuator capable of rotating the wing tip about the hinge;
a first reinforced elastomer panel connecting a bottom surface of the wing and a bottom surface of the wing tip, the first reinforced elastomer panel having a first plurality of reinforcing members running parallel to a leading edge of the wing and a second plurality of reinforcing members running parallel to a trailing edge of the wing; and
a second reinforced elastomer panel connecting an upper surface of the wing and an upper surface of the wing tip, the second reinforced elastomer panel having a first plurality of reinforcing members running parallel to a leading edge of the wing and a second plurality of reinforcing members running parallel to a trailing edge of the wing; and
wherein the first and second elastomer panels facilitate folding of the wing tip without forming gaps or surface discontinuities in the upper and lower surfaces of the wing and wing tip.

32. The wing tip of claim 31, further including a second hinge dividing the wing tip into an inner wing tip and an outer wing tip.

33. The wing tip of claim 32, further including a third reinforced elastomer panel connecting a bottom surface of the inner wing tip and a bottom surface of the outer wing tip, the third reinforced elastomer panel having a first plurality of reinforcing members running parallel to a leading edge of the wing tip and a second plurality of reinforcing members running parallel to a trailing edge of the wing tip and a fourth reinforced elastomer panel connecting an upper surface of the inner wing tip and an upper surface of the outer wing tip, the fourth reinforced elastomer panel having a first plurality of reinforcing members running parallel to a leading edge of the wing tip and a second plurality of reinforcing members running parallel to a trailing edge of the wing tip.

34. A method for forming a folding wing which can be folded without forming gaps or surface discontinuities in an outer surface of the wing, the method comprising the steps of:
providing an inner wing portion;
providing an outer wing portion;
using a hinge to secure the inner wing portion to the outer wing portion;
securing an elastomer panel to an edge of the inner wing portion and to an edge of the outer wing portion at an area proximate to the hinge so that the outer wing portion can be pivoted relative to the inner wing portion without forming gaps or surface discontinuities in the outer surface of the wing.

35. The method of claim 34, further comprising the step of:
securing a second elastomer panel between the edge of the inner wing and the edge of the outer wing, where the second elastomer panel is also spaced apart from the elastomer panel.

36. A method for forming a folding wing for an aircraft which can be folded without forming gaps or surface discontinuities in upper and lower surfaces of the folding wing, the method comprising the steps of:
providing an inner wing having an upper surface and a lower surface;
providing an outer wing having an upper surface and a lower surface;
coupling the inner and outer wings together with a hinge to allow the outer wing to be pivoted relative to the inner wing;
securing an upper elastomer panel between the upper surface of the inner wing and the upper surface of the outer wing;

securing a lower elastomer panel between the lower surface of the inner wing and the lower surface of the outer wing; and wherein the upper and lower elastomer panels facilitate pivoting movement of the outer wing relative to the inner wing without allowing gaps to be formed at an area of the folding wing between the inner and outer wings.

\* \* \* \* \*